Nov. 5, 1968  J. R. CANNON  3,409,537
APPARATUS FOR TREATING POLYMERIC FILM IN AN ELECTROSTATIC
FIELD HAVING AN ADJUSTABLE ELECTRODE
Filed Dec. 7, 1965  2 Sheets-Sheet 1
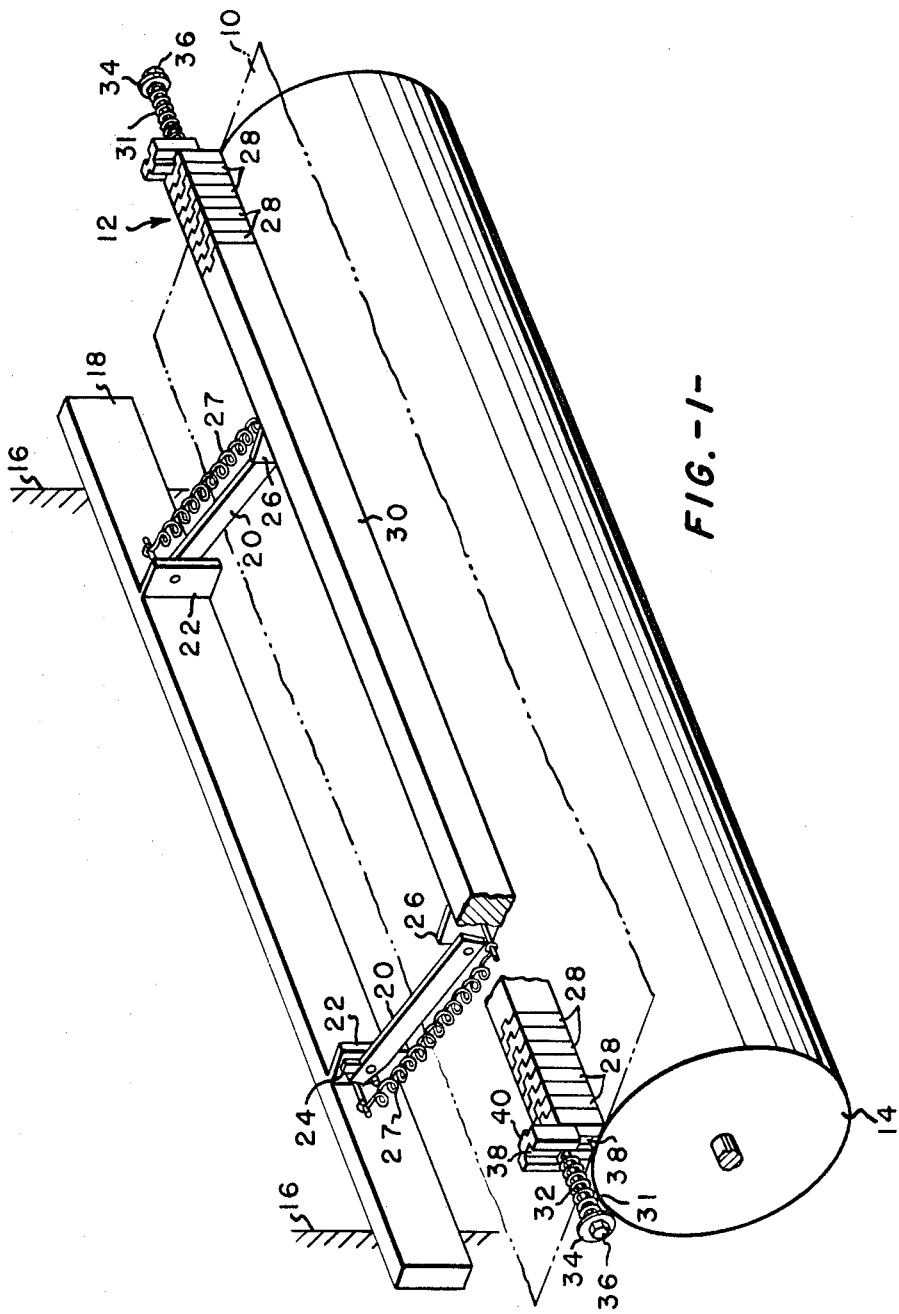
INVENTOR.
JAMES R. CANNON
BY
Earle R. Marden
ATTORNEY

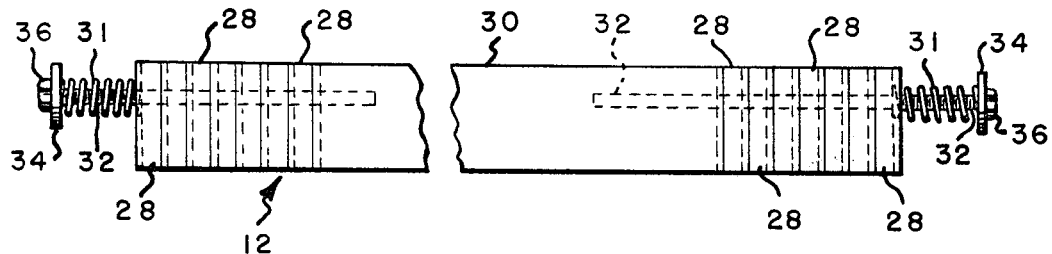
FIG. -2-
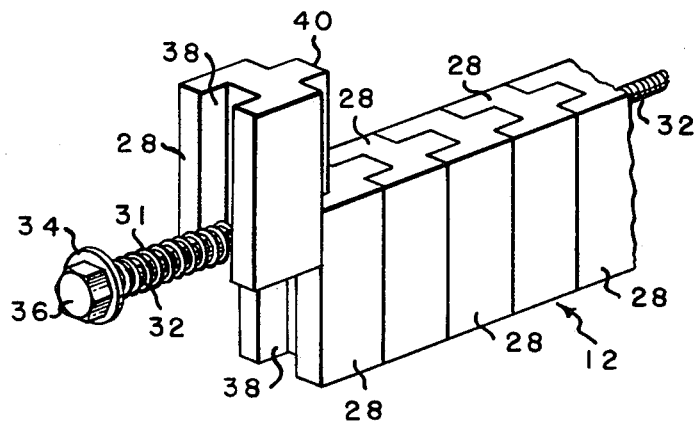
FIG. -3-

United States Patent Office 3,409,537
Patented Nov. 5, 1968

3,409,537
APPARATUS FOR TREATING POLYMERIC FILM IN AN ELECTROSTATIC FIELD HAVING AN ADJUSTABLE ELECTRODE
James R. Cannon, Spartanburg, S.C., assignor to Milliken Tetra Pak, a Division of Clemson Industries, Inc., Pacolet, S.C., a corporation of Delaware
Filed Dec. 7, 1965, Ser. No. 512,145
6 Claims. (Cl. 204—312)

This invention relates to apparatus to treat the surface of a thermoplastic sheet material and in particular to a new and improved electrode to electrostatically treat the surface of polyethylene sheet material to make it gluable and printable.

It is well known in the art to electrostatically treat the surface of a thermoplastic sheet material to provide better adhesive properties and to make the surface more receptive to the application of ink to provide indicia thereon. The electrodes to provide such treatment normally come in fixed lengths and at times may be too long and have deleterious effect on the fabric roll or may be too short and thereby not treat the complete surface of the material. These difficulties occur basically because various width webs of sheet material are run on the same apparatus and no means are provided to vary the length of the electrode.

Therefore, it is an object of the invention to provide an adjustable electrode for the electrostatic treatment of thermoplastic material which can readily be adjusted to conform to the width of material being treated.

Other objects and advantages of the invention will become apparent as the specification proceeds to describe the invention with reference to the accompanying drawings, in which:

FIGURE 1 is a perspective schematic view of the electrostatic treatment of a moving web of thermoplastic material;

FIGURE 2 is a partial front view of the new and improved electrode; and

FIGURE 3 is a partial perspective view of one end of the new and improved electrode.

Looking now to the drawings and especially to FIGURE 1 a thermoplastic web of material 10, such as polyethylene is continuously supplied under the electrode 12 by the roll 14 suitably supported in a frame 16 (not shown in detail). In any suitable manner, a high voltage, low amperage flow of electricity is caused to flow from the electrode 12 to the roll 14 and in doing so electrostatically treats the surface of the web material 10 to make it more susceptible to adhesives and printers' ink and dyes. The phenomena of electrostatic treatment of thermoplastic materials is well known and therefore will not be explained in detail since it does per se form part of the invention.

Electrode 12 is pivotally secured in position over the roll 14 to the support member 18 secured in any suitable manner to the frame 16 through lever arms 20 which are pivotally secured to supports 22 attached to the support member 18. Located on the outside of each support 22 is a stop member 24 which limits the downward movement of the lever arms 20 thereby setting the minimum distance between the roll 14 and the electrode 12. Attached to each of the supports 22 and the electrode supports 26 is a spring 27 to resiliently bias the electrode in the operative position but at the same time will allow the electrode to rise up upon encountering an extra thick portion in the web material 10.

As pointed out previously it is desired to have the electrode approximately the same width as the web of material being treated. To accomplish this end the electrode 12 is provided with a plurality of sections 28 which can be rotated into an inoperative position. Electrically the gap between the electrode 12 and the roll 14 is part of the electrical circuit so that when a portion of the electrode is moved away from the roll this portion becomes electrically inoperative.

The electrode 12 basically consists of a center portion 30 of a length to accommodate the minimum desired width of web material to be run. Connected to each side of the center portion 30 are a plurality of sections 28 which interengage one another and held together by a bolt member 32 which screws into the center portion 30 above the center line thereof and passes through an opening in each section 28 and has a spring 31 on the end thereof to bias the portions 28 toward one another. The springs are located between the outermost portion 28 and the washer 34 which bears against the bolt head 36.

Each of the sections 28 are similar and are so shaped to interengage one another. Each of the sections 28 have a notch 38 on one side therein and a projection 40 on the opposite thereof which conforms to the shape of the notch. In operation the projection 40 of one section 28 will engage the notch 38 of the next adjacent section 28 to form an electrode of a certain predetermined width. The outermost sections 28 will have the springs 31 biasing against the bottom of the notch 38 to bias the sections 28 into a close fit.

If the electrode is too wide a preselected number of sections 28 on each end of the center portion 30 are urged outwardly against the bias of spring 31 until the projections 40 clears the notch 38. Then the sections 28 are rotated to the position denoted by the end sections 28 shown in FIGURES 1 and 3. Then the projection 40 is reengaged in the notch 38 and the spring 31 bias them into a close fitting relationship except that the preselected portions 28 are now not in operative electrical relationship with the roll 14. Conversely, if it is desired to lengthen the electrode the same procedure is followed except the preselected number of sections are rotated into operative position as shown in FIGURES 1 and 2.

Applicant's novel adjustable electrode is simple in construction and easy to adjust. By merely cutting off the power to the electrode, moving the sections 28 outward against the bias of the springs 31, rotating the sections upward or downward and resetting the sections 28 in the notches 38 it is possible to easily obtain any desired length of electrode within the design limitations of such electrode.

Although I have described specifically the preferred embodiment of my invention, I contemplate that many changes may be made without departing from the scope or spirit of my invention and I desire to be limited only by the scope of the claims.

That which is claimed is:

1. In an apparatus for treating film in an electrostatic field including a first electrode and a second electrode in the shape of a roller adjacent the first electrode, substantially axially parallel to said first electrode and adapted to create an electrostatic field with said first electrode, and means for supplying an electrical current to said electrodes causing said electrostatic field to be supported therebetween, the improvement wherein said first electrode includes an elongated electrode portion, and at least one electrode element at least at one side of said elongated electrode portion, means connecting said electrode element to said elongated electrode portion allowing selective movement of said electrode element radially away from said axis of said second electrode to reduce the effective length of said first electrode.

2. The structure of claim 1 wherein said electrode element are resiliently biased toward said elongated electrode portion.

3. The structure of claim 2 wherein there are a plurality of electrode elements.

4. The structure of claim 2 wherein said means includes a bolt projecting through said electrode element and connected to said elongated electrode portion above the center line thereof and a spring member between said element and the head of said bolt to retain said electrode portion in engagement with said elongated electrode portion.

5. The sturcture of claim 4 wherein each of said electrode elements has a notch in one side and a projection on the other side, said notch of one electrode element accommodating the projection of the next adjacent electrode element.

6. The structure of claim 1 wherein there are a plurality of electrode elements and each of said electrode elements has a notch in one side and a projection on the other side, said notch of one electrode element accommodating the projection of the next adjacent electrode element.

References Cited

UNITED STATES PATENTS 3,174,748   3/1965   Roberts et al. _____ 204—312

ROBERT K. MIHALEK, *Primary Examiner.*